(12) United States Patent
Kobayashi et al.

(10) Patent No.: US 6,532,771 B1
(45) Date of Patent: Mar. 18, 2003

(54) METHOD FOR CONTROLLING GLASS FURNACE ATMOSPHERE

(75) Inventors: Hisashi Kobayashi, Putnam Valley, NY (US); William Joseph Snyder, Ossining, NY (US); Kuang Tsai Wu, White Plains, NY (US)

(73) Assignee: Praxair Technology, Inc., Danbury, CT (US)

( * ) Notice: Subject to any disclaimer, the term of this patent is extended or adjusted under 35 U.S.C. 154(b) by 16 days.

(21) Appl. No.: 09/932,929

(22) Filed: Aug. 21, 2001

(51) Int. Cl.[7] .............................................. C03B 5/225
(52) U.S. Cl. .................... 65/134.4; 65/134.1; 65/134.9; 65/134.6; 65/136.3; 65/346; 65/347
(58) Field of Search ............................ 65/134.1, 134.4, 65/134.9, 347, 134.6, 136.3, 346

(56) References Cited

U.S. PATENT DOCUMENTS

| | | | |
|---|---|---|---|
| 4,473,388 A | * 9/1984 | Lauwers | 65/134.4 |
| 5,586,999 A | * 12/1996 | Kobayashi | 65/134.3 |
| 5,609,481 A | 3/1997 | Kobayashi | 432/22 |
| 5,609,662 A | 3/1997 | Kobayashi et al. | 65/135.1 |
| 5,628,809 A | 5/1997 | Kobayashi | 65/134.4 |
| 5,922,097 A | * 7/1999 | Kobayashi et al. | 65/134.1 |
| 6,253,578 B1 | * 7/2001 | Kobayashi et al. | 65/134.4 |
| 6,422,041 B1 | * 7/2002 | Simpson et al. | 65/134.4 |

* cited by examiner

Primary Examiner—James Derrington
(74) Attorney, Agent, or Firm—Donald T. Black

(57) ABSTRACT

Glass is produced in a glassmelting furnace by combusting fuel and oxidant having an oxygen content greater than 80 vol. % oxygen in a melting zone to form molten glass, wherein the surface of the molten glass is exposed to the gaseous atmosphere in the melting zone and the water vapor content of the atmosphere at the surface of the molten glass is greater than 35 vol. %, and oxidant having an oxygen content greater than 80 vol. % is injected into the refining zone of the furnace under conditions to minimize mixing of said oxidant with gases above said oxidant and sweep water vapor at the surface of the molten glass into the melting zone to lower the water vapor content of the atmosphere at the surface of the molten glass.

8 Claims, 1 Drawing Sheet

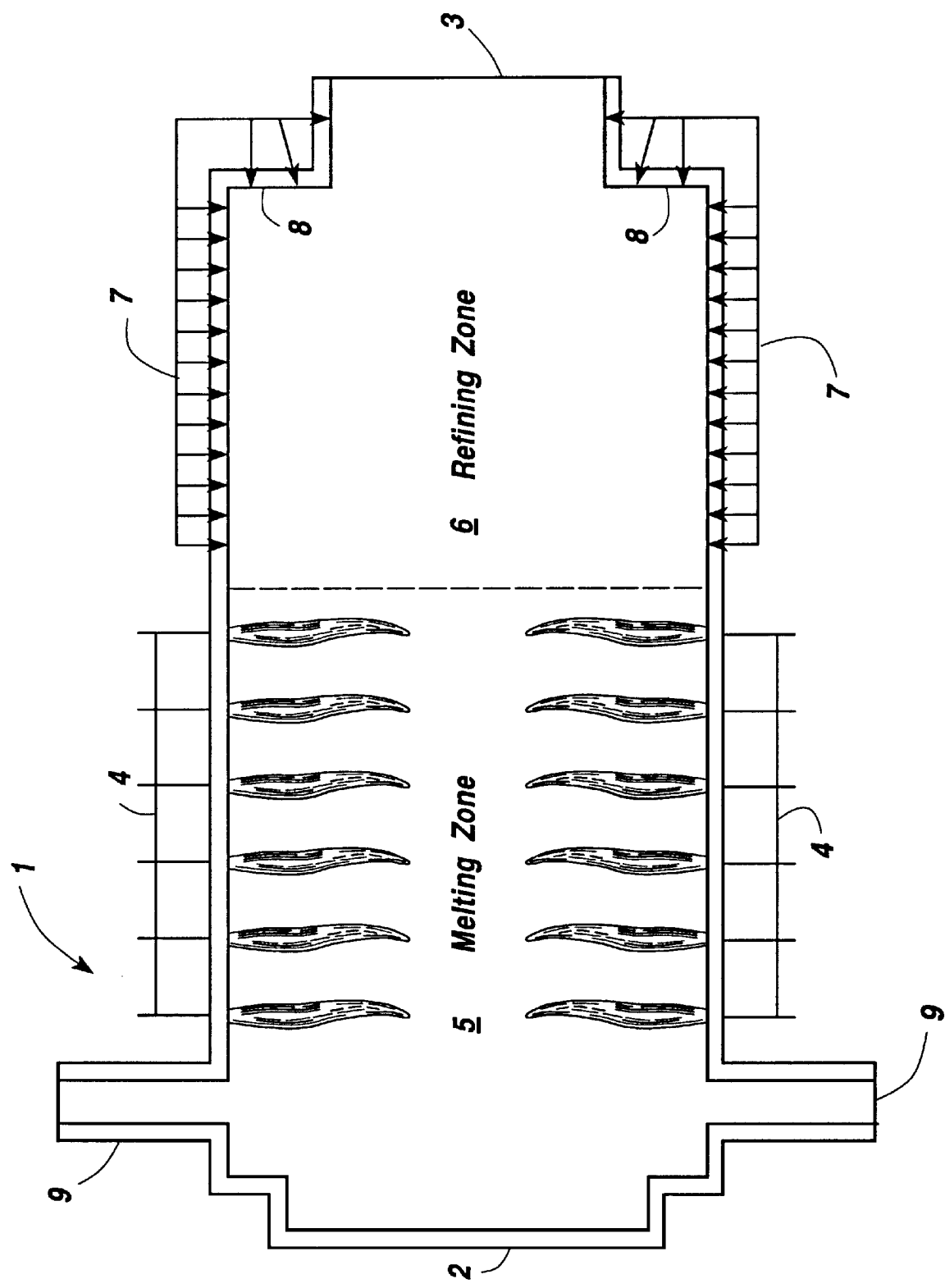

METHOD FOR CONTROLLING GLASS FURNACE ATMOSPHERE

FIELD OF THE INVENTION

The present invention relates to methods for producing glass, especially float glass.

BACKGROUND OF THE INVENTION

There are several different techniques for producing glass. In a typical furnace to produce glass, the glassmaking components are fed to a glassmaking furnace where they melt under various forms of heat to form molten glass. Gas bubbles formed during the melting step are removed during the fining step by growing the bubbles by gas generating reactions using fining agents such as sodium sulfate. Residual small gas bubbles are reabsorbed into glassmelt during the refining step as the glassmelt cools down and travels to a refiner through a submerged throat. For the product known by the term "float glass", the glassmaking components are fed to a glassmaking furnace where they melt under various forms of heat to form molten glass. This molten glass exits the melting furnace through a narrow restriction, termed a "waist", then undergoes a temperature conditioning step prior to flowing out on top of a pool of molten metal, typically molten tin. The molten glass spreads out, "floating" on the molten metal, and forms a sheet or slab of glass. Sheets and slabs of glass are generally required to be of high quality, especially in being free of visible defects and unevenness in the top and bottom surfaces, and the float glass technique is generally considered to be an effective technique for producing sheets and slabs of glass which are of the necessary high quality.

Conventional glass furnaces have been fired by combusting fuel in air, wherein the oxygen required for the combustion is provided by the air. In recent years, many glass furnaces have successfully been operated by combusting the fuel with oxygen-enriched air (by which is meant oxidant comprising at least 80 vol. % oxygen) or with essentially pure oxygen. These furnaces, sometimes termed "oxy-fuel" furnaces, provide numerous advantages including (but not limited to) greater efficiency, enhanced fining reactions, higher temperature, reduced volume of gas to be handled, and reduced formation of particulate matter and of NOx (by which is meant oxides of nitrogen such as NO, $N_2O$, $NO_2$, and the like)

The concentration of water vapor in the atmosphere of an oxy-fuel fired furnace is typically in a range between 50 to 65% as compared with 15 to 20% for an air-fuel fired furnace. A higher water vapor pressure in the atmosphere increases dissolution of water into glassmelt, which in turn enhances fining reactions to grow gas bubbles in the glassmelt. During the refining step, however, higher water content in glassmelt reduces the dissolution rate of water vapor in small residual gas bubbles back to glassmelt.In some instances small bubbles can find their way into the final product, resulting in higher than normal reject rates of the product.

A potential solution to this problem is lowering the partial pressure of water at the glass surface in the areas where the small bubbles need to be reabsorbed by blowing air into the furnace near the exit end (waist) to reduce the concentration of combustion products, and hence water, at the glass surface. The goal in this effort would be to minimize the amount of air required by finding the best location/technique for air injection.

Injecting air into the furnace may benefit the glass quality, but it brings along with it many other undesirable side effects. First and foremost is a reduction in energy efficiency. The added air will be heated in the furnace and leave at the furnace exhaust gas temperature, typically around 2700° F. This puts an additional heat load on the furnace requiring more fuel to produce the same amount of glass. This effect is mitigated by preheating the air before injecting it into the furnace. However, that would require additional heat exchangers and other capital equipment to be implemented. In addition, the temperature to which the air could be preheated is limited by the heat exchanger design and will never attain the same level as the flue gas exit temperature.

The second effect that injecting air will have is to increase NOx emissions from the furnace. Part of the benefit of converting to oxy-fuel firing is to eliminate nitrogen from the combustion process and thereby allow reduced NOx emissions from the glass making process. Purposely introducing air into the process will diminish the value of using oxy-fuel firing.

The third effect of adding air to the process is that it will increase the flue gas volume leaving the furnace. This normally may not be a problem, unless there is some flue gas treatment equipment downstream of the furnace. Increasing flue gas volumes could require upgrading the flue gas handling equipment leading to additional cost of the manufacturing process.

Thus, there remains a need for a method of manufacturing float glass in an oxy-fuel fired furnace which avoids the possibility to form defects in the surface of the glass product.

BRIEF SUMMARY OF THE INVENTION

One aspect of the present invention is a method of producing glass, comprising providing a glassmelting furnace having a melting zone equipped with burners for combusting fuel and oxidant and an unfired refining zone, feeding glassmaking materials into the melting zone, feeding fuel and oxidant having an oxygen content greater than 80 vol. % oxygen to said burners and combusting said fuel and said oxidant in the melting zone to generate heat to melt the glassmaking materials in the melting zone to form molten glass, wherein the surface of the molten glass is exposed to the gaseous atmosphere in the melting zone and the water vapor content of the atmosphere at the surface of the molten glass is greater than 35 vol. %, passing the molten glass into said refining zone, cooling the molten glass in the refining zone without combusting fuel and oxidant in the refining zone, and injecting oxidant having an oxygen content greater than 80 vol. % into the refining zone at a sufficiently low velocity below 50 feet per second to minimize mixing of said oxidant with gases above said oxidant to displace water vapor at the surface of the molten glass in the refining zone into the melting zone and lower the water vapor content of the atmosphere at the surface of the molten glass in the refining zone to less than 25 vol. %, wherein the amount of oxidant injected into the refining zone and the amount of oxidant fed to said burners together equal from 85% to 120% of the stoichiometric amount needed for complete combustion of said fuel.

The invention involves using a portion of the oxygen necessary for combustion and injecting it into the refining end of the furnace to control the water vapor concentration in that end of the furnace. This diverted oxygen would then flow toward the burners and be consumed as part of the combustion process, thereby fully utilizing the gas required for blanketing the glass surface.

This method presents the following advantages, among others:

1) No additional fuel would be required as no extra gases are being added to the furnace.
2) Only minor modifications need be made to the oxygen piping system to implement the solution.
3) NOx levels should be reduced due to the staging effect produced by diverting some of the oxygen away from the high temperature burner area.
4) No increase in flue gas volume would occur.
5) Operating the burners fuel-rich tends to destabilize foam in glass furnaces. This may be an added benefit if the fuel-rich operation of the burners reduces the level of foam in the furnace and allows better heat transfer to the glass.
6) The added gas flow helps to cool the glass in the refining zone.

BRIEF DESCRIPTION OF THE DRAWINGS

The FIGURE is a top plan view of a float glass furnace incorporating an embodiment of the present invention.

DETAILED DESCRIPTION OF THE INVENTION

The FIGURE depicts furnace 1 in top view. Glassmaking materials are charged at one end 2 of the furnace and molten glass is withdrawn at the other end 3. The glassmaking materials may include one or more of sand, soda ash, limestone, dolomite, salt cake, niter, rouge, and cullet (scrap glass), and may include any other materials useful in the production of glass.

Burners 4 are located in the melting zone 5 which is adjacent to the charging end 2 of the furnace. The burners are typically located spaced apart in the walls of the furnace. Any number of burners can be provided, depending on the size and desired production rate of the furnace, and on the heat output rating of the particular burner being used. Any burner type can be used, which combusts fuel and oxidant in the melting zone to generate heat for melting the glassmaking materials. Typical burner types include concentric bodies, wherein fuel and oxidant are injected from concentrically disposed passages, and staged burners, wherein fuel and oxidant are injected from adjacent ports and combust together.

The oxidant useful in this invention is a gas or gas mixture comprising at least 80 vol. % oxygen, and preferably at least 90 vol. % oxygen. Typical fuels useful with this invention include methane, natural gas, propane, oil, and hydrogen.

The melting zone 5 typically occupies about 50% to 66% of the furnace length to supply the necessary energy to melt the glassmaking materials. The remainder of the furnace (i.e. 34% to 50% of the furnace) constitutes refining zone 6. This zone is left unfired to allow the glass time to cool and rid itself of bubbles caused by the melting process.

Combustion gases are exhausted from the furnace via flues 9, which preferably are located near the feed end 2 to facilitate countercurrent heat transfer to the incoming glassmaking materials before the combustion gases leave the furnace.

As indicated, some of the oxidant necessary for normal operation of the furnace that would conventionally be fed directly into the melting zone, is instead diverted from the burners to the refining zone of the furnace, where no gases are normally injected. This provides a reduced water atmosphere close to the molten glass surface. The oxidant is injected into the refining zone via one or more injectors 7.

The exact proportion of oxidant to divert to the refining zone, and the choice of burners from which oxidant is diverted, can readily be determined so as to optimize performance and production of glass of satisfactory quality. In general, it has been determined that the burners closest to the flue ducts should preferably be operated closest to their stoichiometric conditions to avoid unburnt fuel leaving the furnace and impacting the furnace efficiency. The remaining burners in the furnace should be operated at reduced stoichiometries to provide some oxidant for injection into the refining zone. These burners can operate with 15% to 80% of the oxidant diverted to the refining zone. However, in the preferred arrangement a lesser amount of oxidant (30% to 50% of the normal furnace requirement) is diverted to the refining zone.

The oxidant can be injected into the refining zone 6 in any of several fashions, using any conventional injector. A key point is to maintain a low velocity (less than 50 ft/sec) to minimize mixing of the oxidant with any water-containing furnace gases present in the refining zone. Preferred locations for the injectors 7 are as close as possible to the molten glass surface and as far from the burners as possible. Peepholes on the back wall 8 of the furnace are a convenient location for injecting the oxidant. Preferably, the injected oxidant sweeps the upper surface of the molten glass, and the volume of injected oxidant and the location of injectors 7 are provided to achieve this.

Operating conditions can be optimized but can vary from furnace to furnace depending on the amount of oxidant needed to be injected into the refining zone and the firing rates of the burners closest to the refining zone.

Testing of the concept was conducted in a scaled down physical model of a glass furnace. Burner flows were modeled with air jets, and then portions of the burner flows were diverted to other parts of the furnace to test the ability to achieve horizontal stratification. The test conditions and results achieved are shown below in the table.

| Amount of Diverted $O_2$ | Injection Location | Estimated Water Concentration at Glass Surface (vol %) |
|---|---|---|
| 70% from All Burners | Long Slot at Tuckstone - Low Velocity | 9.9% |
| 70% from All Burners | Long Slot at Tuckstone - Higher Velocity | 9.9% |
| 15% of $O_2$ From Burners #3–#7 | Two Ports on the Front Wall by the Waist | 19.7% |
| 15% of $O_2$ From Burners #3–#7 but Injected as Air | Two Ports on the Front Wall by the Waist | 19.7% |

The concentration of water vapor near the molten glass surface formed in the melting zone with oxy-fuel combustion and passed into the refining zone is typically greater than 50 vol. %, often on the order of 60 vol. % or higher, even as high as about 66 vol. % or higher. This concentration will depend on the type of fuel being burned, with higher hydrogen containing fuels producing higher water concentrations in the atmosphere. The present invention can bring the water vapor concentration at the molten glass surface in the refining zone down to or below 25 vol. %, even 20 vol. % and preferably to 18 vol. % or lower. The present invention can even take the level down lower depending on the actual conditions which may be impacted by air leaks or exhaust gases coming from the conditioning chamber, the next vessel downstream from the melting tank.

The furnace oxidant is the most beneficial gas to use as the gas injected into the refining zone for eliminating water vapor. Any dry gas which does not react chemically with the glass could be considered for this application. However, gases such as air, fuel, $CO_2$, and recirculated flue gas all present complications or economic issues associated with their use. The only gases required to be injected into the furnace are fuel and oxygen, so using these gases for the method of the present invention is the preferred arrangement. Air is the most likely alternative gas due to its low cost and ease of implementation. If only very low volumes of injected gas are required to achieve adequate water vapor removal, then the problems associated with using air or other gases may be circumvented thereby making them viable gases for the subject invention.

The preferred location for the injector(s) 7 should provide maximal access to and coverage of the surface of the molten glass, such as far from the burners and close (preferably, as close as possible) to the molten glass surface. Preferably, the injected oxidant completely blankets the surface of the molten glass as it sweeps water vapor away from that surface and into the melting zone. Also, the velocity of injection should be low so that the entering jet of oxidant does not encourage mixing with the surrounding gases, thereby diluting it and reducing its impact on the water vapor concentration. Other than drilling a hole specifically for oxidant injection, the following locations would prove satisfactory:

1) Through peepholes in the sidewalls and back wall (waist end of furnace)
2) Along the joint between the tuckstone and sidewall blocks
3) In the waist area, downstream of the melter, with waist area exhaust gases directed towards the melter
4) Through the crown with jets directed downward In most cases, multiple injectors 7 would be preferred over one or two single jets to aid with flow distribution and to keep velocities low. The shape of the jets is not important; slots or cylindrical holes could be used.

What is claimed is:

1. A method of producing glass, comprising providing a glassmelting furnace having a melting zone equipped with burners for combusting fuel and oxidant and an unfired refining zone, feeding glassmaking materials into the melting zone, feeding fuel and oxidant having an oxygen content greater than 80 vol. % oxygen to said burners and combusting said fuel and said oxidant in the melting zone to generate heat to melt the glassmaking materials in the melting zone to form molten glass, wherein the surface of the molten glass is exposed to the gaseous atmosphere in the melting zone and the water vapor content of the atmosphere at the surface of the molten glass in the melting zone is greater than 35 vol. %, passing the molten glass into said refining zone, cooling the molten glass in the refining zone without combusting fuel and oxidant in the refining zone, and injecting oxidant having an oxygen content greater than 80 vol. % into the refining zone at a sufficiently low velocity below 50 feet per second to minimize mixing of said oxidant with gases above said oxidant to displace water vapor at the surface of the molten glass in the refining zone into the melting zone and lower the water vapor content of the atmosphere at the surface of the molten glass in the refining zone to less than 25 vol. %, wherein the amount of oxidant injected into the refining zone and the amount of oxidant fed to said burners together equals from 85% to 120% of the stoichiometric amount required for complete combustion of said fuel.

2. A method according to claim 1 wherein the total amount of oxidant injected into the refining zone is 15% to 80% of the stoichiometric amount of oxidant needed for complete combustion of said fuel fed to said furnace.

3. A method according to claim 1 wherein the total amount of oxidant injected into the refining zone is 30% to 50% of the stoichiometric amount of oxidant needed for complete combustion of said fuel fed to said furnace.

4. A method according to claim 1 wherein the oxidant injected into the refining zone blankets the entire upper surface of the molten glass in the refining zone.

5. A method according to claim 1 wherein the oxidant fed to said melting zone and injected into said refining zone comprises at least 90 vol. % oxygen.

6. A method according to claim 5 wherein the total amount of oxidant injected into the refining zone is 15% to 80% of the stoichiometric amount of oxidant needed for complete combustion of said fuel fed to said furnace.

7. A method according to claim 5 wherein the total amount of oxidant injected into the refining zone is 30% to 50% of the stoichiometric amount of oxidant needed for complete combustion of said fuel fed to said furnace.

8. A method according to claim 5 wherein the oxidant injected into the refining zone blankets the entire upper surface of the molten glass in the refining zone.

* * * * *